US011962879B2

(12) United States Patent
Kawai et al.

(10) Patent No.: US 11,962,879 B2
(45) Date of Patent: Apr. 16, 2024

(54) IMAGING APPARATUS

(71) Applicant: DENSO CORPORATION, Kariya (JP)

(72) Inventors: Nobuharu Kawai, Kariya (JP); Kiwako Takezawa, Kariya (JP); Takeshi Kazama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/504,302

(22) Filed: Oct. 18, 2021

(65) Prior Publication Data

US 2022/0124234 A1 Apr. 21, 2022

(30) Foreign Application Priority Data

Oct. 20, 2020 (JP) ................................. 2020-175935

(51) Int. Cl.
*H04N 23/52* (2023.01)
*H04N 23/51* (2023.01)
*H04N 23/54* (2023.01)

(52) U.S. Cl.
CPC ............. *H04N 23/52* (2023.01); *H04N 23/51* (2023.01); *H04N 23/54* (2023.01)

(58) Field of Classification Search
CPC ......... H04N 23/52; H04N 23/51; H04N 23/54
USPC .......................................................... 348/148
See application file for complete search history.

(56) References Cited

U.S. PATENT DOCUMENTS

| 5,345,107 A * | 9/1994 | Daikoku | H01L 25/0655 257/E23.098 |
|---|---|---|---|
| 5,706,171 A * | 1/1998 | Edwards | H05K 7/20454 361/705 |
| 2002/0039658 A1* | 4/2002 | Bunyan | F16J 15/14 252/514 |
| 2002/0056509 A1* | 5/2002 | Miura | H05K 3/207 156/231 |
| 2008/0068803 A1* | 3/2008 | Chen | H01L 23/467 361/708 |
| 2010/0015512 A1* | 1/2010 | Inoue | H01M 10/643 361/714 |
| 2011/0156236 A1* | 6/2011 | Ma | H01L 21/568 438/122 |

(Continued)

FOREIGN PATENT DOCUMENTS

DE 102017110354 A1 11/2018
JP 2005-134567 A 5/2005
(Continued)

*Primary Examiner* — Matthew David Kim
(74) *Attorney, Agent, or Firm* — MASCHOFF BRENNAN

(57) ABSTRACT

An imaging apparatus mounted in a vehicle includes an imager substrate, a housing, and a heat dissipator. The imager substrate has an image sensor mounted thereon. The housing is equipped with a rear wall extending in an in-plane direction perpendicular to a thickness of the imager substrate and has the imager substrate disposed therein. The heat dissipator is arranged between the imager substrate and the rear wall in contact therewith to transfer heat from the imager substrate to the rear wall. The rear wall has a substrate-facing surface facing the imager substrate through the heat dissipator and also has a retainer arranged on the substrate-facing surface to hold the heat dissipator thereon. This structure ensures enhanced stability in releasing thermal energy from the image sensor or the imager substrate.

11 Claims, 8 Drawing Sheets

(56) References Cited

U.S. PATENT DOCUMENTS

| | | | |
|---|---|---|---|
| 2012/0292307 A1* | 11/2012 | Kim | C03C 17/3607 |
| | | | 156/60 |
| 2013/0206199 A1* | 8/2013 | Lassiter | H10N 10/10 |
| | | | 136/206 |
| 2015/0312456 A1* | 10/2015 | Bauer | H04N 23/51 |
| | | | 348/374 |
| 2018/0069994 A1 | 3/2018 | Nakamura | |
| 2019/0288586 A1* | 9/2019 | Takemoto | H02K 11/33 |
| 2019/0320159 A1 | 10/2019 | Ishii et al. | |
| 2019/0346126 A1 | 11/2019 | Wada | |
| 2021/0035880 A1* | 2/2021 | Goh | H01L 23/367 |
| 2021/0368082 A1* | 11/2021 | Solar | H04N 23/51 |
| 2022/0270947 A1* | 8/2022 | Kurahori | H01L 23/3672 |
| 2022/0291572 A1* | 9/2022 | Oba | H04N 23/52 |
| 2022/0348001 A1* | 11/2022 | Tepner | H01L 31/18 |

FOREIGN PATENT DOCUMENTS

| | | |
|---|---|---|
| JP | 2006-251058 A | 9/2006 |
| JP | 2010-193308 A | 9/2010 |
| JP | 2011-087157 A | 4/2011 |
| JP | 2017-228876 A | 12/2017 |
| WO | 2020159914 A1 | 8/2020 |

* cited by examiner

IMAGING APPARATUS

CROSS REFERENCE TO RELATED DOCUMENT

The present application claims the benefit of priority of Japanese Patent Application No. 2020-175935 filed on Oct. 20, 2020, the disclosure of which is incorporated in its entirety herein by reference.

BACKGROUND

1 Technical Field

This disclosure relates generally to an imaging apparatus mounted in a vehicle.

2 Background Art

Japanese Patent First Publication No. 2018-42141 discloses an image capturing device which is mounted on an inner surface of a windshield of a vehicle and works to capture an image of a forward view outside the vehicle. The image capturing device includes a housing, an optical unit, an imager substrate, and an image processing substrate. The imager substrate has an image sensor mounted thereon. The image sensor is implemented by a semiconductor image sensor, such as a CMOS image sensor. The image processing substrate has an image processing LSI and connectors mounted thereon. The image processing LSI works to process an image signal outputted from the image sensor. The optical unit, the imager substrate, and the image processing substrate are arranged inside the housing.

The housing includes two parts: a case and a cover. The case and the cover face each other and are joined together to complete the housing. The cover defines a bottom wall and a portion of a side wall of the housing. The cover is made from an aluminum material.

The bottom wall of the housing has a thermal conductive member disposed thereon. The thermal conductive member is arranged between the bottom wall and the image processing LSI. The thermal conductive member transmits thermal energy between the bottom wall and the image processing LSI and is made of material having a high thermal conductivity. The image processing LSI is placed in contact with the bottom wall through the thermal conductive member, so that heat generated by the image processing LSI is dissipated from the bottom wall through the thermal conductive member.

The image processing LSI and the image sensor are arranged away from each other, thereby minimizing transfer of thermal energy from the image processing LSI that is a heat source to the image sensor adversely sensitive to heat. This protects the image sensor from heat.

In recent years, it has been essential for the above type of imaging devices to take measures against heat due to an increased density of pixels.

SUMMARY

It is an object of this disclosure to provide a heat dissipator for an image sensor and/or an imager substrate on which the image sensor is mounted.

According to one aspect of this disclosure, there is provided an imaging apparatus which is mounted in a vehicle comprises: (a) an imager substrate on which an image sensor is mounted; (b) a housing which has a plate-like rear wall extending in an in-plane direction perpendicular to a thickness-wise direction of the imager substrate, the housing having the imager substrate disposed therein; and (c) a heat dissipator which is arranged between the imager substrate and the rear wall in contact with the imager substrate and the rear wall to release heat from the imager substrate to the rear wall. The rear wall has a substrate-facing surface which faces the imager substrate through the heat dissipator. The rear wall is equipped with a retainer which holds the heat dissipator on the substrate-facing surface.

Symbols in brackets attached to component parts, as discussed below, are used only to indicate exemplified correspondences between the symbols and the component parts. It should be, therefore, appreciated that the invention is not limited to the described component parts.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Embodiments will be described below with reference to the drawings. Each of the embodiments may be designed to include all possible combinations or modifications of the components in the other embodiments. A modification(s) of each of the embodiments will be described following discussion of the embodiments.

First Embodiment

Vehicle Structure

Figure 1:
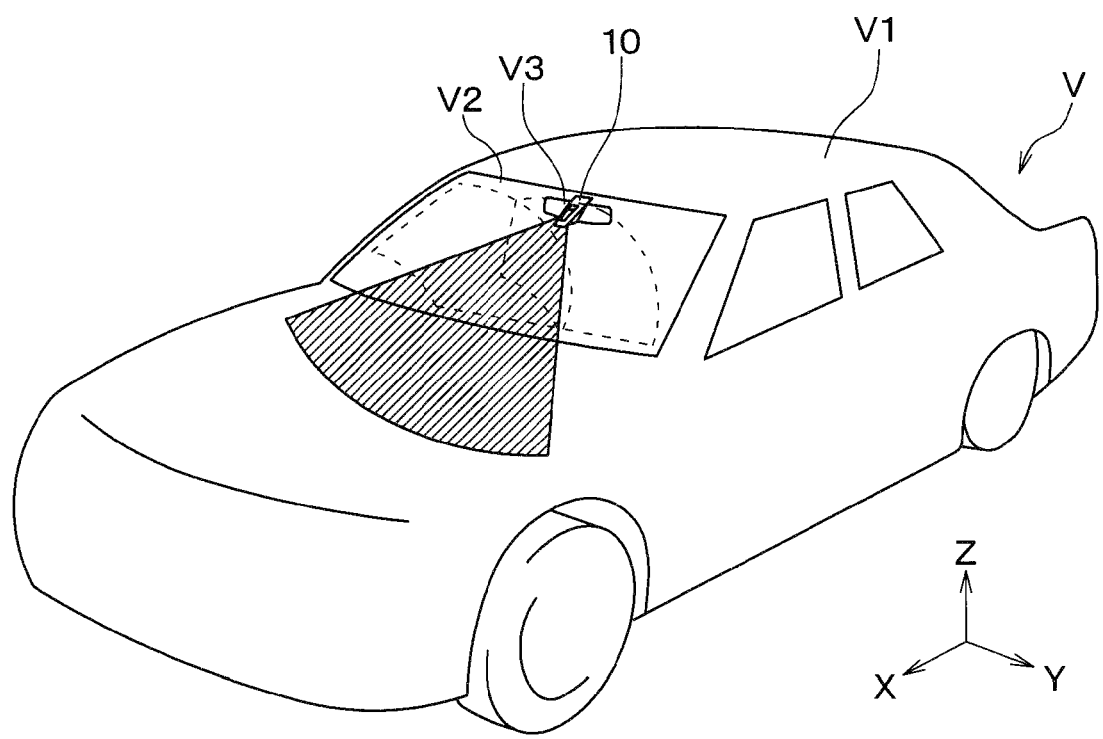
FIG. 1 is a perspective view which illustrates a vehicle in which an imaging apparatus according to the first embodiment is mounted.

Referring to FIG. 1, the vehicle Vis implemented by a four-wheel automotive vehicle and equipped with the box-shaped vehicle body V1. For the sake of convenience of explanation, right-handed X-Y-Z Cartesian coordinate system is defined in an illustrated matter. The x-axis in the positive direction indicates a frontward direction of the vehicle. The y-axis extends parallel to a widthwise direction of the vehicle. The z-axis in the positive direction indicates an upward vertical direction of the vehicle. The frontward direction of the vehicle, as referred to herein, is a direction parallel to a length of the vehicle V in which the vehicle V moves straight in the forward direction. The upward vertical direction, as referred to herein, is a direction opposite a direction of gravitational force when the vehicle V is in a drivable stable position on a horizontal plane. In the following discussion, the positive direction along the x-axis will also be referred to as a front side or a frontward direction. The negative direction along the x-axis will also be referred to as a rear side or a rearward direction. The positive direction along the y-axis will also be referred to as a right side or a rightward direction. The negative direction along the y-axis will also be referred to as a left side or a leftward direction. The positive direction along the z-axis will also be referred to as an upper side or an upward direction. The negative direction along the z-axis will also be referred to as a down side or a downward direction.

The vehicle body V1 has the front windshield V2 disposed on the front thereof. The rearview mirror V3 is disposed in a passenger compartment that is space within the vehicle body V1 and exposed to the front windshield V2. The rearview mirror V3 is located close to an upper end of the front windshield V2 and the center of a length of the front windshield V2 extending in the widthwise direction of the vehicle V.

Figure 2:
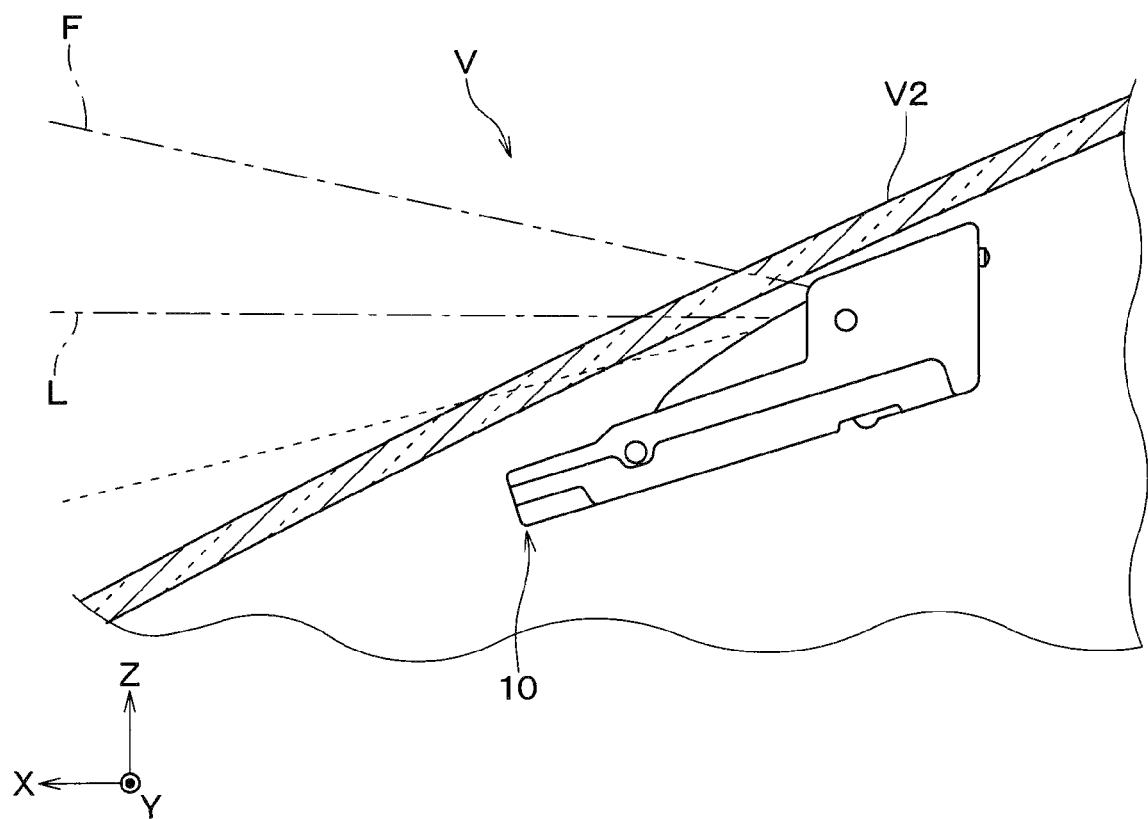
FIG. 2 is an enlarged partial sectional view which illustrates an imaging apparatus arranged inside a vehicle in the first embodiment.

The imaging apparatus 10 is mounted in the vehicle V. In the following discussion, the condition where the imaging apparatus 10 is mounted in the vehicle V will also be referred to as a mounted condition. Referring to FIGS. 1 and 2, the imaging apparatus 10 is arranged in the mounted condition to capture an image of a forward view outside the vehicle V. Specifically, in this embodiment, the imaging apparatus 10 is attached to a portion of the front windshield V2 near the rearview mirror V3 within the passenger compartment. FIG. 2 illustrates a field of view F and an optical axis L of the imaging apparatus 10 using chain lines.

Figure 3:
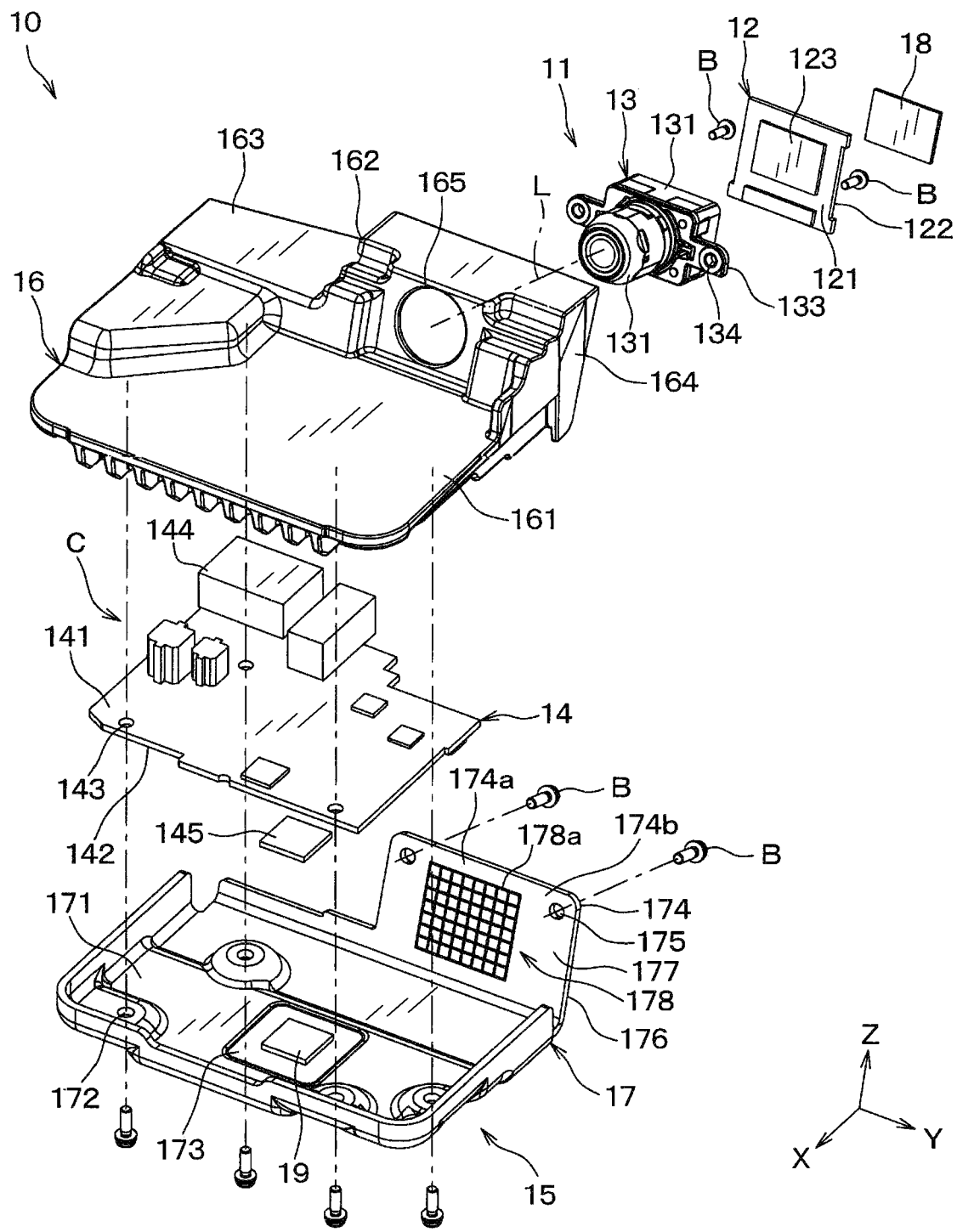
FIG. 3 is an exploded perspective view which illustrates the imaging apparatus in FIG. 2.
Figure 4:
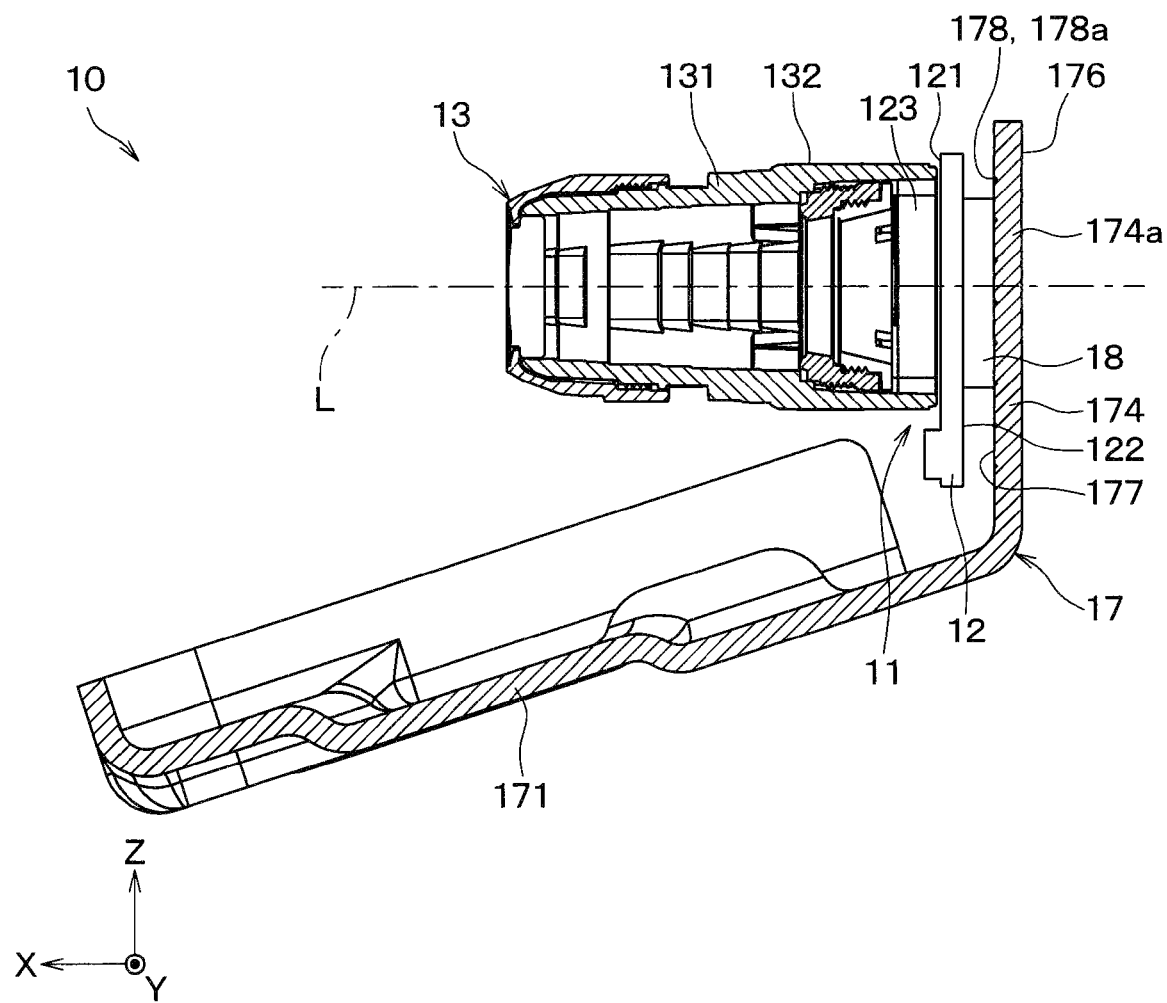
FIG. 4 is a partial sectional side view of the imaging apparatus in FIG. 2.

Referring to FIGS. 3 and 4, the imaging apparatus 10 is equipped with the camera module 11. The camera module 11 includes an imager substrate 12 and the optical unit 13. The imaging apparatus 10 includes the image processing substrate 14 and the housing 15. The camera module 11 and the image processing substrate 14 are disposed inside the housing 15. The housing 15 includes the first housing body 16 and the second housing body 17. The housing 15 also has the heat dissipator 18 and the second heat dissipator 19 disposed therein. Parts of the imaging apparatus 10 will be described below in detail.

Camara Module

The imager substrate 12 is of a flat plate shape and has a pair of major surfaces: the device mounting surface 121 and the back surface 122. The major surfaces, as referred to herein, are outer surfaces of a plate-like member which are oriented to have a normal line extending in a thickness-wise direction of the plate-like member. Specifically, the thickness-wise direction of the imager substrate 12 is identical with a direction in which a normal line of each of the device mounting surface 121 and the back surface 122 extends. A direction perpendicular to the thickness-wise direction of the imager substrate 12 will also be referred to as an in-plane direction.

The imager substrate 12 is disposed in the housing 15 to have the in-plane direction intersecting with the horizontal direction in the mounted condition. Specifically, the imager substrate 12 is, as illustrated in FIGS. 3 and 4, supported by the housing to have the thickness-wise direction thereof oriented substantially parallel to the horizontal direction so that the in-plane direction agrees with the vertical direction.

Figure 5:
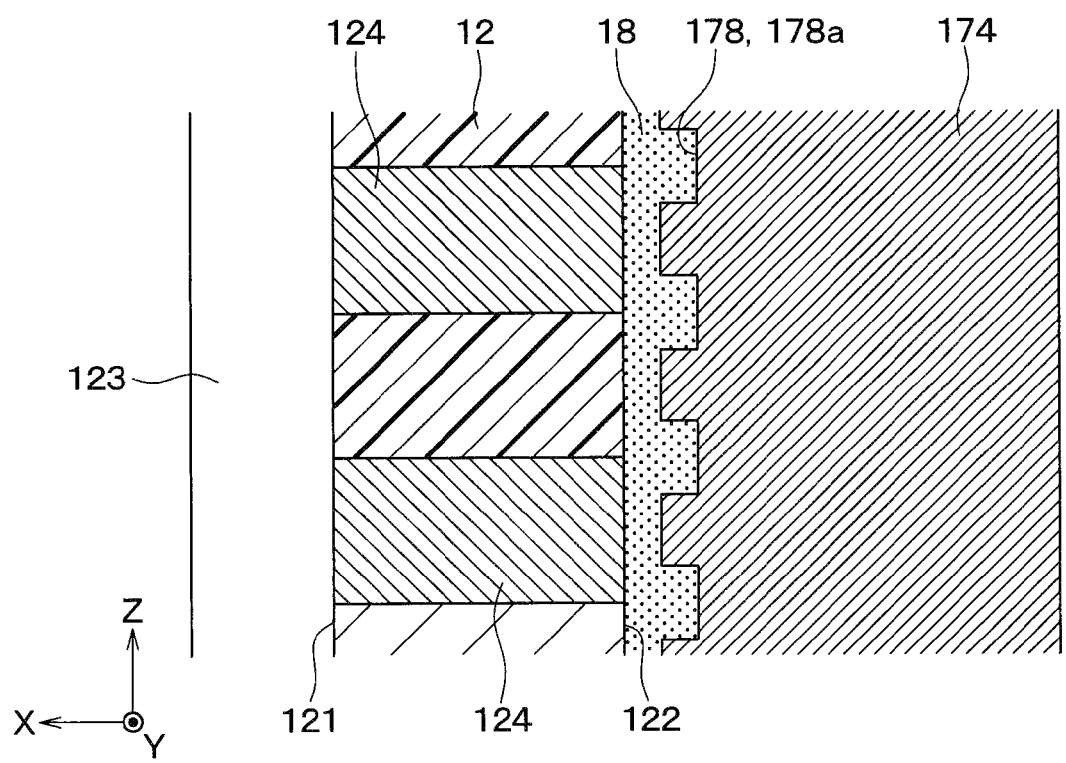
FIG. 5 is an enlarged sectional side view which illustrates an imager substrate and a rear wall of a housing of the imaging apparatus in FIG. 2.

Referring to FIGS. 3 to 5, the imager substrate 12 is implemented by a printed circuit board equipped with the image sensor 123 and the through-hole conductors 124. The image sensor 123 is made of a semiconductor image sensor, such as a CMOS image sensor and installed on the device mounting surface 121. The through-hole conductors 124 extend through the thickness of the imager substrate 12 and serve to release heat, as generated by the image sensor 123, to the back surface 122.

The optical unit 13 includes the lens barrel 131 and the base 132. The lens barrel 131 and the base 132 are joined together in the form of a unit using synthetic resin. The lens barrel 131 is of a cylindrical shape extending in the frontward direction and has disposed therein a plurality of lenses arranged adjacent each other on the optical axis L. The lens barrel 131 has a rear end supported by the base 132.

The base 132 is of a box- or bathtub-shape with an opening facing in the rearward direction. The rear end with the opening of the base 132 is joined to the device mounting surface 121 of the imager substrate 12 using adhesive. In other words, the camera module 11 is made by joining the imager substrate 12 and the optical unit 13 together.

The base 132 has a pair of attachment tabs 133 for use in fixing the camera module 11 to the housing 15. Each of the attachment tabs 133 is formed by a plate-like portion of the base 132 which has a thickness in the longitudinal direction. The attachment tabs 133 extend right and left from the base 132. Each of the attachment tabs 133 has formed therein the module-fastening hole 134 which extends through the thickness of the attachment tab 133. Each of the module-fastening holes 134 is shaped to permit a screw B to pass therethrough to secure the camera module 11 to the housing 15.

Image Processing Substrate

The image processing substrate 14 is of a flat plate-shape with two major surfaces: the first surface 141 and the second surface 142. The image processing substrate 14 is disposed in the housing 15 with the first surface 141 located above the second surface 142. The image processing substrate 14 has formed in corners thereof the screw holes 143 through which screws B pass.

The image processing substrate 14 is made of a printed circuit board with conductive traces and circuit devices mounted on the first surface 141 and the second surface 142. Specifically, the first surface 141 has the connector 144 mounted thereon. The connector 144 is supplied with electrical power from the vehicle V and works to provide communication with an external device disposed in the vehicle V. The connector 144 is arranged on a rear right end portion of the first surface 141.

In this embodiment, the image processing substrate 14 is placed to extend non-parallel to the imager substrate 12. Specifically, the image processing substrate 14 extends in the thickness-wise direction of the imager substrate 12. More specifically, the imaging apparatus 10 is designed to orient the imager substrate 12 and the image processing substrate 14 so that an angle which the thickness-wise direction of the imager substrate 12 makes with that of the image processing substrate 14 lies in a range of 60° to 120°.

The image processing substrate 14 has mounted thereon the image processing device 145 which is implemented by an image processing LSI working to process an image signal outputted from the image sensor 123. The image processing device 145 is mounted on the second surface 142. For the ease of visibility, FIG. 3 illustrates the image processing device 145 as being disposed away from the image processing substrate 14.

Housing

The housing 15 is made of two separable parts: the first housing body 16 and the second housing body 17 disposed below the first housing body 16. In this embodiment, the first housing body 16 and the second housing body 17 are made from aluminum-based material.

The first housing body 16 is aluminum die-casted as a unit. The first housing body 16 includes the substrate cover 161 and the bulging portion 162. The substrate cover 161 is of a flat plate shape facing the first surface 141 of the image processing substrate 14 and covers the first surface 141. The bulging portion 162 rises upward from a rear end of the substrate cover 161. The bulging portion 162 is of an L-shape in cross section thereof and has a rear opening.

The bulging portion 162 includes the connector housing 163 and the module support 164. The connector housing 163 is defined by a right portion of the bulging portion 162 and covers above the connector 144. In other words, the connector housing 163 extends upward from a right rear portion of the substrate cover 161.

The module support 164 is located on the right side of the connector housing 163 in the bulging portion 162. The module support 164 is configured to firmly support the camera module 11 using screws B fastened into the module-fastening holes 134 of the attachment tabs 133. The module support 164 has formed therein the lens barrel hole 165 through which the lens barrel 131 passes.

The second housing body 17 is formed by a pressed plate made from aluminum-based material. The second housing body 17 is of an L-shape, as viewed in the lateral direction. The second housing body 17 has the bottom wall 171 that is a plate-like member facing the image processing substrate 14. The bottom wall 171 extends along the second surface 142 of the image processing substrate 14.

The bottom wall 171 has formed in corners thereof the screw holes 172 through which screws B pass. The housing 15 is made by stacking the first housing body 16, the image processing substrate 14, and the second housing body 17 on one another in this order and fastening the screws B into the first housing body 16 through the screw holes 143 and the screw holes 172. This achieves firm retention of the image processing substrate 14 in the housing 15. The bottom wall 171 has the device-facing portion 173 in the shape of a recess with an opening oriented upward. The device-facing portion 173 is located close to and faces the image processing device 145.

The second housing body 17 has the bottom wall 171 and the rear wall 174. The rear wall 174 is of a flat plate-shape and extends upward from a rear end of the bottom wall 171. In other words, the rear wall 174 extends in the in-plane direction, that is, substantially parallel to the imager substrate 12.

The rear wall 174 includes the substrate-facing portion 174a and the marginal portion 174b. The substrate-facing portion 174a is located close to and faces the imager substrate 12. The marginal portion 174b substantially surrounds the substrate-facing portion 174a. The marginal portion 174b has formed therein the screw holes 175 through which screws B passes to secure the rear wall 174 to the bulging portion 162 of the first housing body 16.

Heat Dissipator

The rear wall 174 has a pair of opposed major surfaces: the outer wall surface 176 and the substrate-facing surface 177. The outer wall surface 176 which faces an external space outside the housing 15 is exposed backward. The substrate-facing surface 177 faces an inner space of the housing 15 in which the imager substrate 12 and the image processing substrate 14 are disposed. In this embodiment, the substrate-facing surface 177 has a flat surface exposed obliquely upward frontward. The substrate-facing surface 177, as can be seen in FIG. 5, faces the imager substrate 12 through the heat dissipator 18.

The substrate-facing surface 177 is equipped with the retainer 178 which holds the heat dissipator 18. In this embodiment, the retainer 178 is defined by a plurality of bumps and dips (also called convexities and concavities) arranged adjacent each other in the in-plane direction. Specifically, the retainer 178 includes a plurality of grooves 178a defining the bumps and the dips on and in the substrate-facing surface 177. The grooves 178a are arranged in a grid-like pattern. A region occupied by the retainer 178 is, as clearly illustrated in FIG. 4, larger in size than that occupied by the heat dissipator 18. Specifically, an area of the substrate-facing surface 177 occupied by the retainer 178 is selected to be larger than that of the substrate-facing surface 177 to which the heat dissipator 18 is projected in a direction in which a normal line of the substrate-facing surface 177 extends. In other words, the retainer 178 is shaped to have an area larger than an area on which the heat dissipator 18 is laid, as viewed in a plane defined to extend in a direction perpendicular to the thickness of the rear wall 174. The laid area of the heat dissipator 18, as referred to herein, is an area occupied by the heat dissipator 18 at a time when the substrate-facing surface 177 is first arranged to face the imager substrate 12 through the heat dissipator 18 during production of the imaging apparatus 10. An interval between the substrate-facing surface 177 and the imager substrate 12 at the above time is determined to be identical with a required design dimension when the imaging apparatus 10 is completed. The laid area of the heat dissipator 18 will, therefore, also be referred to as an initial contact region where the heat dissipator 18 contacts the imager substrate 12 or the rear wall 174 at the above time.

The heat dissipator 18 is disposed between the imager substrate 12 and the rear wall 174 in direct contact with the imager substrate 12 and the rear wall 174, thereby facilitating dissipation or transfer of heat from the imager substrate 12 to the rear wall 174. In other words, the heat dissipator 18 is firmly retained by the imager substrate 12 and the rear wall 174. The heat dissipator 18 is made of thermal grease (also called thermal compound or thermal gel) that is a viscoelastic material having a viscosity of 100 to 1,000 Pa·s at −10° C. to 70° C.

In this embodiment, the imaging apparatus 10 is equipped with a heat dissipating mechanism which facilitates transfer or dissipation of heat from a circuit C including the imager substrate 12 and the image processing substrate 14 to the housing the housing 15. The heat dissipating mechanism includes the second heat dissipator 19 in addition to the heat dissipator 18. The second heat dissipator 19 is placed in direct contact with the housing 15 at a location away from the heat dissipator 18.

Specifically, the second heat dissipator 19 is, like the heat dissipator 18, made of thermal grease and applied to the surface of the device-facing portion 173 of the bottom wall 171. Specifically, the second heat dissipator 19 is arranged between the bottom wall 171 and the image processing substrate 14 in contact therewith to dissipate or transfer thermal energy from the image processing substrate 14 to the bottom wall 171. In other words, the second heat dissipator 19 is held between the bottom wall 171 and the image processing substrate 14.

Beneficial Advantages

The imaging apparatus 10 in this embodiment offers the following beneficial advantages.

In recent years, it has been essential for imaging devices to take measures to heat with an increased density of pixels. It, therefore, becomes increasingly important for the imaging apparatus 10 to thermally protect the circuit C including the imaging substrate 12 on which the image sensor 123 is mounted. The imaging apparatus 10 mounted in the vehicle V is sometimes exposed to high-temperature environments and thus required to facilitate dissipation of heat from the circuit C to ensure the stability in operation of the imaging apparatus 10.

In order to meet the above requirement, the imaging apparatus 10 in this embodiment is designed to use the heat dissipating mechanism equipped with the heat dissipator 18 which is retained between the imager substrate 12 and the rear wall 174 of the housing 15 to facilitate the dissipation or transfer of heat from the imager substrate 12 to the housing 15. The heat dissipator 18 may be made of inexpensive thermal grease, but however, there is a concern that a high degree of viscoelasticity of the thermal grease may cause the camera module 11 to be out of focus. In order to alleviate such a problem, it is advisable that the heat dissipator 18 be made of thermal grease having a low viscosity of 100 to 1,000 Pa·s at −10° C. to 70° C.

The size of an air gap between the imager substrate 12 on which the heat dissipator 18 is disposed and the rear wall 174 usually depends upon an individual variability arising from production errors thereof. The viscosity of the thermal grease may also depend upon a part number or a rot number thereof. Therefore, in order to eliminate a risk that the thermal grease may flow into the air gap between the imager substrate 12 and the rear wall 174 and also to maximize the ability of the heat dissipator 18, a used volume of the thermal grease is selected depending upon the size of the air gap and the viscosity of the thermal grease.

When the heat dissipator 18 is made of thermal grease having a relatively low viscosity, it leads to a risk of the pump-out. In this embodiment, the imager substrate 12 is oriented to extend in the vertical direction, in other words, the air gap between the image substrate 12 to which the heat dissipator 18 made of thermal grease is applied and the rear wall 174 extends vertically with openings facing in opposite vertical directions, thereby facilitating the ease with which the heat dissipator 18, i.e., the thermal grease flows downward.

In this embodiment, the rear wall 174 is equipped with the retainer 178 which holds the heat dissipator 18. This ensures the stability in holding the heat dissipator 18 in the air gap between the imager substrate 12 and the rear wall 174 even when the heat dissipator 18 is made of thermal grease having a low viscosity. The structure in this embodiment, therefore, realizes the heat dissipating mechanism capable of achieving a required degree of dissipation of heat from the image sensor 123 or the imager substrate 12 on which the imager sensor 123 is mounted.

Figure 6:
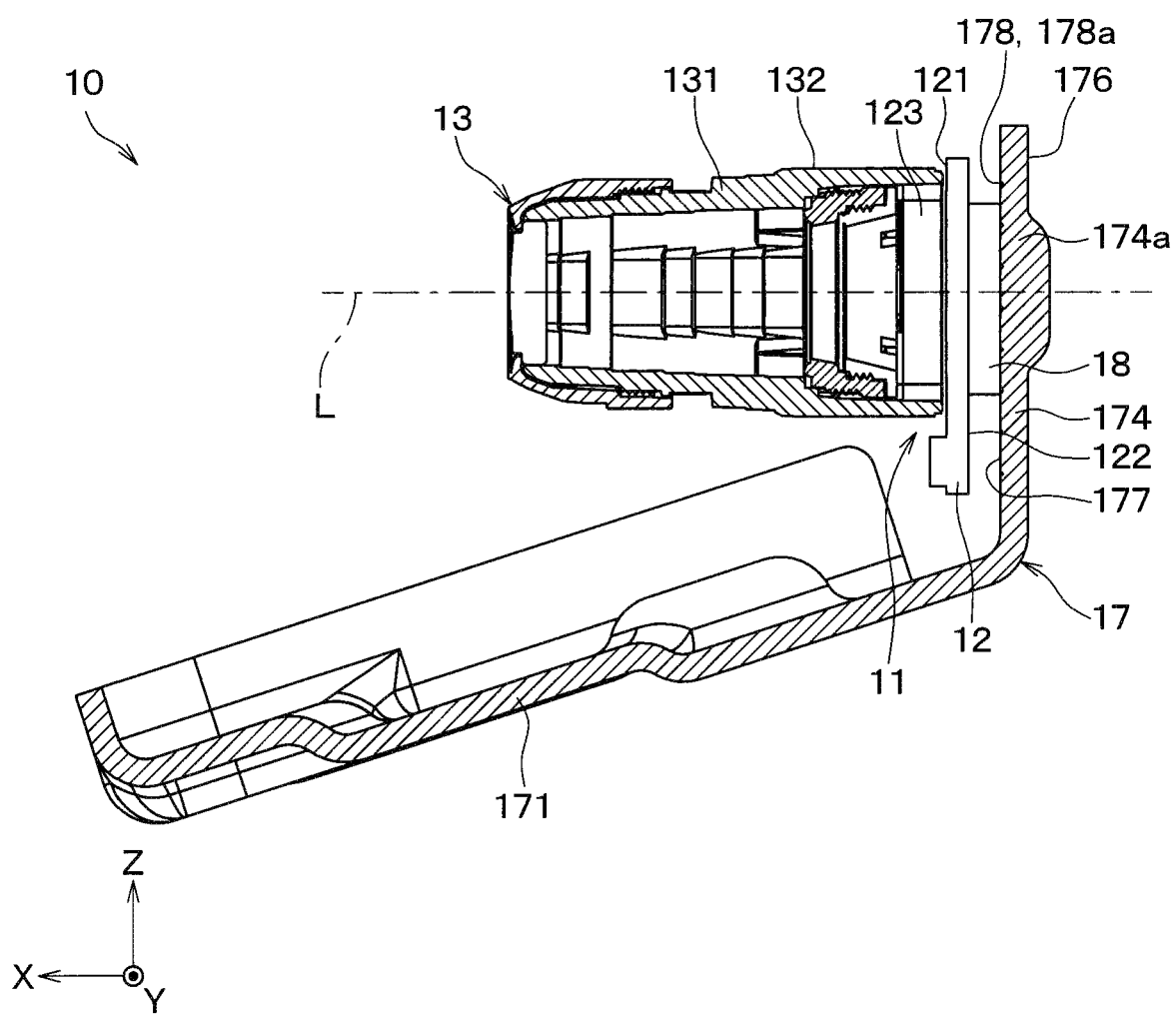
FIG. 6 is a partial sectional side view which illustrates an imaging apparatus according to the second embodiment.

The imager substrate 12 in this embodiment is, as already described with reference to FIG. 6, equipped with the through-hole conductors 124. Each of the through-hole conductors 124 has a first end and a second end opposed to the first end in the thickness-wise direction of the imager substrate 12. The first ends of the through-hole conductors 124 are placed in contact with the image sensor 123. The second ends of the through-hole conductor 124 are placed in contact with the heat dissipator 18. This structure serves to enhance the transfer of heat from the image sensor 123 to the housing 15.

In this embodiment, the heat dissipator 18 works to transfer the heat from the imager substrate 12 to the rear wall 174 of the housing 15. Similarly, the second heat dissipator 19 works to transfer the heat from the image processing substrate 14 to the bottom wall 171 of the housing 15. In other words, thermal energy, as generated in the circuit C during an imaging operation thereby, is dissipated to the housing 15 through two heat transfer paths in two different directions. This achieves the dissipation of a larger amount of heat from the circuit C to the housing 15 than in the conventional structure.

In this embodiment, the second housing body 17 to which the heat is dissipated from the circuit C is formed by a pressed plate made from an aluminum-based material having a high degree of thermal conductivity, thereby achieving dissipation of a required quantity of heat from the circuit C. The dissipation of heat from the circuit C may be enhanced by increasing the thickness of the second housing body 17 as needed.

Second Embodiment

The second embodiment will be described below with reference to FIG. 6. The following discussion will refer only to parts of the second embodiment which are different from those in the first embodiment. The same or similar reference numbers as those used in the first embodiment will refer to the same or similar parts, and explanation thereof in detail will be omitted here.

The structure of the imaging apparatus 10 in this embodiment is the same as in the first embodiment. The substrate-facing portion 174a of the rear wall 174 is, as illustrated in FIG. 6, designed to have a thickness larger than that of a remaining portion of the second housing body 17, thereby enhancing the dissipation of heat from the imager substrate 12.

Third Embodiment

The third embodiment will be described below with reference to FIGS. 7 and 8. The following discussion will refer only to parts of the second embodiment which are different from those in the first embodiment.

Figure 7:
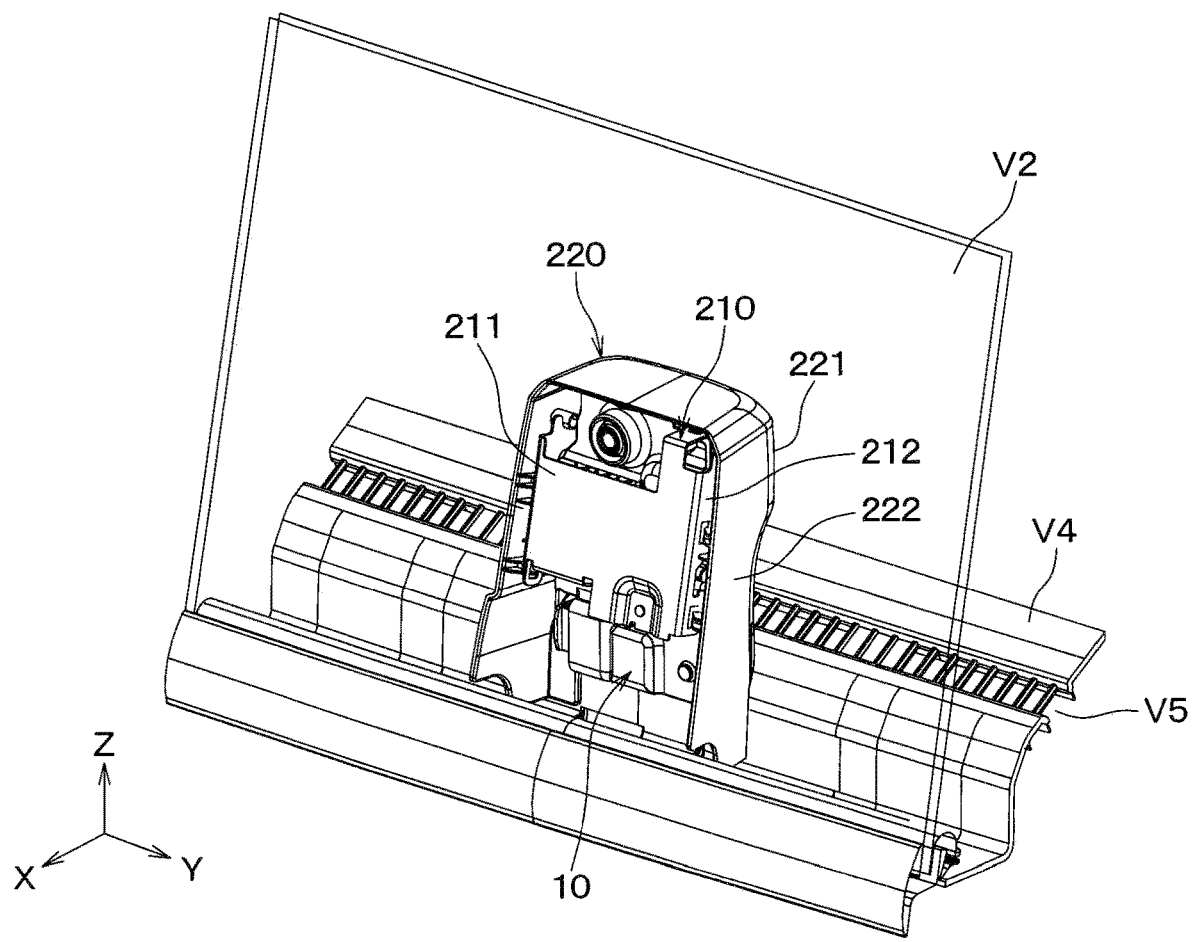
FIG. 7 is a perspective view which illustrates an imaging apparatus mounted in a vehicle according to the third embodiment.

The imaging apparatus 10 in this embodiment is, as clearly illustrated in FIG. 7, secured to a lower end of the front windshield V2 of the vehicle V that is a full-sized station wagon, a minivan, a motortruck, or a bus. Specifically, the imaging apparatus 10 is arranged between the lower end of the front windshield V2 and the dashboard V4 of the vehicle V at a location where a flow of air emerging from the air outlet V5 in the dashboard V4 hits the imaging apparatus 10.

More specifically, the imaging apparatus 10 in this embodiment is retained by the holder 210 serving as a fixture. The holder 210 includes the holder bottom plate 211 and a pair of holder side plates 212. The holder bottom plate 211 is fixed to the lower end of the front windshield V2 using a double-faced adhesive tape. The holder side plates 212 extend from ends of the holder bottom plate 211 which are opposed to each other in the width-wise direction of the holder bottom plate 211 and are exposed inside the passenger compartment of the vehicle V. The imaging apparatus 10 is held between the holder side plates 212 to be detachable from the holder 210.

The imaging apparatus 10 which is retained by the holder 210 is covered with the garnish cover 220. The garnish cover 220 is detachably mounted on the holder 210. The garnish cover 220 includes the covering plate 221 and a pair of cover side plates 222.

The covering plate 221 shrouds the imaging apparatus 10 with the garnish cover 220 mounted on the holder 210 to isolate the imaging apparatus 10 from the passenger compartment. The cover side plates 222 extend from ends of the width of the covering plate 221 toward the front windshield V2 in a condition where the garnish cover 220 is fit on the holder 210. The cover side plates 222 are located outside the holder side plates 212 in the condition where the garnish cover 220 is fit on the holder 210. The cover side plates 222 is equipped with fasteners, not shown, which engage the holder side plates 212.

Figure 8:
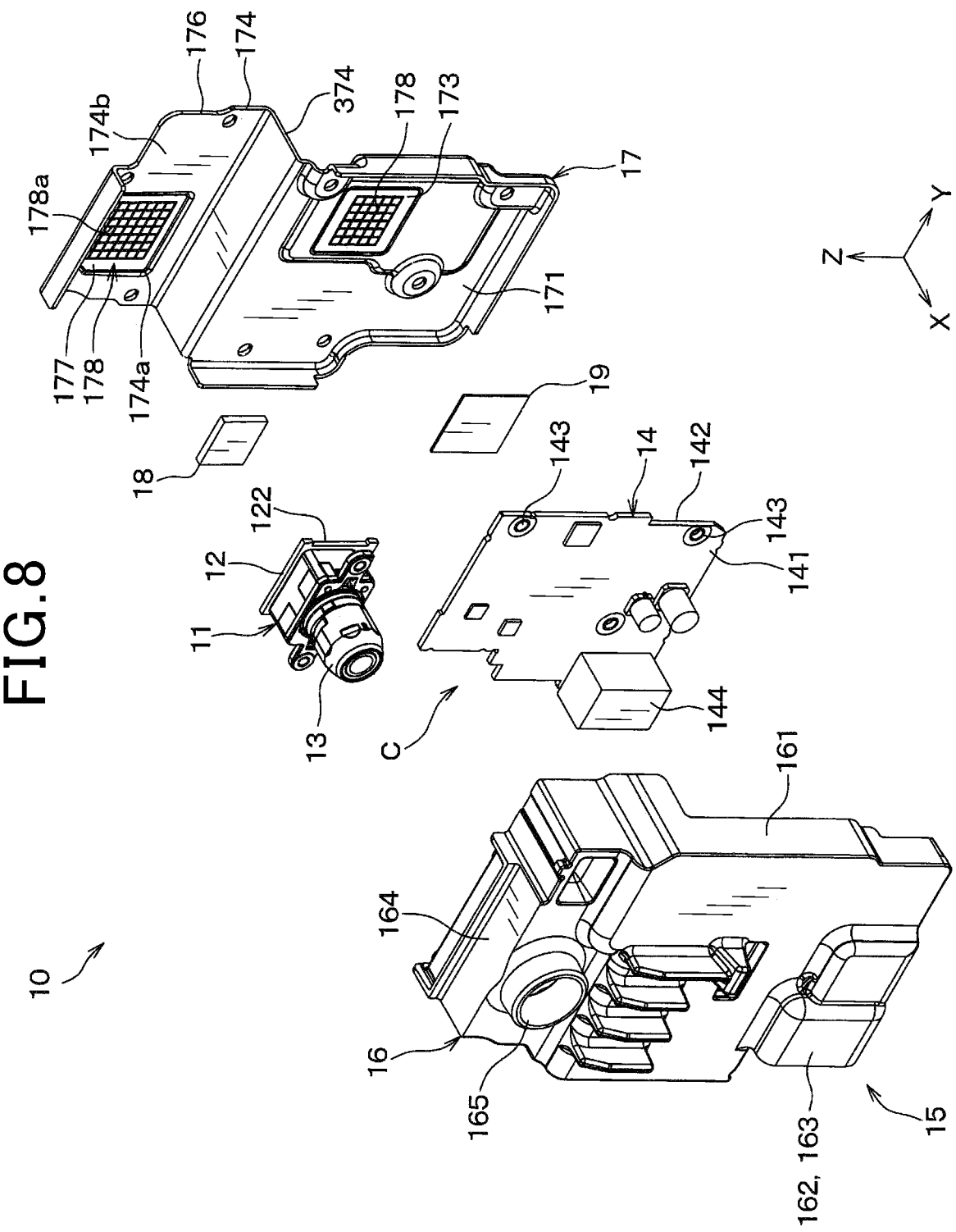
FIG. 8 is an exploded perspective view of the imaging apparatus in FIG. 7.

Referring to FIG. 8, the imager substrate 12 is arranged to have the in-plane direction thereof which intersects with the horizontal direction in the mounted condition. The image processing substrate 14 in this embodiment is, however, arranged substantially parallel to the imager substrate 12, while the first housing body 16 and the second housing body 17 have structures slightly different from those in the first embodiment.

The first housing body 16 in this embodiment has the connector housing 163 which serves as the bulging portion 162 and protrudes from the lower end of the substrate cover 161 in the thickness-wise direction of the image processing substrate 14, that is, the frontward direction. The connector housing 163 is of a substantially L-shape, as viewed in a cross section thereof, with an opening facing downward. The module support 164 is disposed on an upper end of the substrate cover 161 and extends upwards.

The second housing body 17 in this embodiment has the plate-like bottom wall 171 which faces the image processing substrate 14 and is oriented to extend vertically in the mounted condition. The bottom wall 171 has the device-facing portion 173 formed therein in the shape of a recess opening frontwards.

The rear wall 174 is located in back of and above the upper end of the bottom wall 171. Specifically, the rear wall 174 extends upward from the connecting portion 374 which extends backward from the upper end of the bottom wall 171. The substrate-facing portion 174a is formed in the shape of a recess and has an opening facing frontward. The substrate-facing surface 177 is defined by a flat surface of the substrate-facing portion 174a which is exposed frontward.

The second housing body 17 is equipped with the two retainers 178 each of which is created by the grooves 178a which are arranged adjacent each other in the in-plane direction and define bumps and dips on and in the surface of the second housing body 17. The retainers 178 are aligned, one with each of the heat dissipator 18 and the second heat dissipator 19.

The above structure of the second embodiment offers substantially the same beneficial advantages as those in the first embodiment. The second embodiment is, as described above, equipped with the retainer 178 which holds the second heat dissipator 19 held between the image processing substrate 14 and the bottom wall 171. This ensures the stability in retaining the second heat dissipator 19 made of thermal grease extending vertically in the air gap which is created between the image processing substrate 14 and the bottom wall 171 and opens downward.

The heat dissipator 18 for the imager substrate 12 and the second heat dissipator 19 for the image processing substrate 14 are placed in contact with the second housing body 17 that is a rear part of the housing 15. The rear of the housing 15 is subjected to conditioned air emerging from the air outlet V5 in the dashboard V4 so that it is cooled, thereby enhancing the dissipation of heat from the imager substrate 12 and the image processing substrate 14.

Modification

While the preferred embodiments have been disclosed in order to facilitate better understanding of the invention, it should be appreciated that the invention can be embodied in various ways without departing from the principle of the invention. Modification of the above embodiments will be described below in terms of differences from the above embodiments. The same or similar reference numbers as those in the above embodiment will refer to the same or similar parts, and explanation thereof in detail will be omitted here.

The imaging apparatus 10 may be used as one of various types of devices, such as a dashboard camera, a vehicle traveling data recorder, or an object detecting camera used in a self-driving system or a driving assistance system.

The location of installation of the imaging apparatus 10 is not limited to the above described place in the first embodiment. For instance, the imaging apparatus 10 is mounted on the rearview mirror V3.

The housing 15 may be made of one of various types of material. For instance, the first housing body 16 may be made of a synthetic resin-made product. The housing 15 may be equipped with heat-dissipating fins.

The imaging apparatus 10 may be modified to have portions used to join parts thereof without use of the screws B.

The device-facing portion 173 may be formed to have a shape other than a recess. For instance, the device-facing portion 173 may be shaped to lie flush with a portion therearound.

The grooves 178a of the retainer 178 are arranged in a grid-like pattern, but however, may alternatively be arranged in a stripe pattern.

The retainer(s) 178 may be made of a combination of protrusions and recesses other than the grooves 178a. For instance, the retainer(s) 178 may be made of linear protrusions arranged in a grid or stripe pattern. The retainer(s) 178 may alternatively be made of a plurality of cylinders, cones, frusto-cones, or domed protrusions which are arranged adjacent each other in the in-plane direction.

Alternatively, the retainer(s) 178 may be made of a plurality of semispherical recesses arranged adjacent each other in the in-plane direction or formed by roughing the substrate-facing surface 177 using physical processing, such as sandblasting, or chemical processing, such as etching.

The heat dissipating mechanism for the circuit C may be designed to have a structure different from those in the above embodiments. For instance, the heat dissipator 18 may additionally be arranged at a location other than the air gap between the imager substrate 12 and the rear wall 174 in order to release heat from the imager substrate 12. Similarly, the second heat dissipator 19 may additionally be arranged at a location other than the air gap between the image processing substrate 14 and the bottom wall 171 in order to release heat from the image processing substrate 14.

Specifically, material which will function as the heat dissipator 18 and/or the second heat dissipator 19 may be disposed in a portion or the whole of inner space of the housing 15 to create an air-tight or liquid-tight seal of the housing 15. For instance, thermal grease may be injected into or disposed in an air gap between the first housing body 16 and the imager substrate 12 and/or between the first housing body 16 and the image processing substrate 14 to release heat from the first housing body 16.

The boiling temperature of the thermal grease disposed in the housing 15 is selected to be slightly higher than an ambient temperature of the image sensor 123 in the summer sun. In this case, when the system is activated upon turning on of the ignition switch of the vehicle V, so that the image sensor 123 starts to be warmed, it will cause the thermal grease to be evaporated. The heat of evaporation of the thermal grease will contribute to cooling of the imager substrate 12 and the image processing substrate 14.

The above structure achieves a required degree of dissipation of heat from the imager substrate 12 and the image processing substrate 14. The resistance to noise may be enhanced to improve EMC (i.e., electromagnetic compatibility) of the imaging apparatus 10 by controlling a used quantity of the thermal grease or selecting a place where the thermal grease is arranged to regulate a resonance frequency band of the imaging apparatus 10.

A plurality of component parts which are formed integrally with each other in a seamless way referred to in the above discussion may alternatively be made of a plurality of discrete parts attached to each other. Similarly, an assembly of discrete parts joined together referred to in the above discussion may alternatively be made of a single seamless member without any joint.

A plurality of component parts, as referred to in the above discussion, which are made from the same material may alternatively be made from materials different from each other. Similarly, a plurality of component parts, as referred to in the above discussion, which are made from different materials may be made from the same material.

The component parts described in the above embodiments are not necessarily essential unless otherwise specified or viewed to be essential in principle. When the number of the component parts, a numerical number, a volume, or a range is referred to in the above discussion, this disclosure is not limited to it unless otherwise specified or viewed to be essential in principle. Similarly, when the shape of, the orientation of, or the positional relation among the component parts is referred to in the above discussion, this disclosure is not limited to it unless otherwise specified or viewed to be essential in principle.

The above modifications are also not limited to the above described examples. A portion or whole of the embodiment may be combined with one or some of the modifications.

What is claimed is:

1. An imaging apparatus which is mountable in a vehicle comprising:
   an imager substrate on which an image sensor is mounted;
   a housing which has a plate-like rear wall extending in an in-plane direction perpendicular to a thickness-wise direction of the imager substrate, the housing having the imager substrate disposed therein; and
   a heat dissipator which is arranged within a gap between the imager substrate and the rear wall in contact with the imager substrate and the rear wall to release heat from the imager substrate to the rear wall, wherein
   the rear wall has a substrate-facing surface which faces the imager substrate through the heat dissipator, the rear wall being equipped with a retainer, the retainer is configured to hold the heat dissipator on the substrate-facing surface and inhibit the heat dissipator from flowing downward and out of the gap along the in-plane direction,
   the retainer includes grooves defined by convexities and concavities, and
   the heat dissipator is made of a viscoelastic material having a viscosity of 100 to 1,000 Pa·s at −10° C. to 70° C.

2. The imaging apparatus as set forth in claim 1, wherein the grooves are arranged in a grid pattern.

3. The imaging apparatus as set forth in claim 1, further comprising a second heat dissipator which is located away from the heat dissipator and arranged in contact with the housing to transfer heat from a circuit including the imager substrate to the housing.

4. The imaging apparatus as set forth in claim 3, wherein the housing includes a plate-like bottom wall which faces an image processing substrate on which an image processing device is mounted which works to process an image signal outputted from the image sensor, and wherein the second heat dissipator is arranged between the bottom wall and the image processing substrate in contact with the bottom wall and the image processing substrate to transfer heat from the image processing substrate to the bottom wall.

5. The imaging apparatus as set forth in claim 1, wherein the imager substrate has a through-hole conductor which extends through a thickness of the imager substrate.

6. The imaging apparatus as set forth in claim 1, wherein the in-plane direction intersects with a horizontal direction when the imaging apparatus is mounted in the vehicle.

7. The imaging apparatus as set forth in claim 1, wherein a region occupied by the retainer is larger in size than that occupied by the heat dissipator.

8. The imaging apparatus as set forth in claim 1, wherein the heat dissipator is disposed over both the convexities and the concavities of the retainer in the thickness-wise direction of the imager substrate.

9. The imaging apparatus as set forth in claim 1, wherein the convexities of the retainer are spaced a distance from a rear-wall facing surface of the imager substrate in the thickness-wise direction of the imager substrate.

10. The imaging apparatus as set forth in claim 1, wherein the of the grooves comprise dips that are formed in the substrate-facing surface.

11. An imaging apparatus which is mountable in a vehicle comprising:
    an imager substrate on which an image sensor is mounted;
    a housing which has a plate-like rear wall extending in an in-plane direction perpendicular to a thickness-wise direction of the imager substrate, the housing having the imager substrate disposed therein; and
    a heat dissipator which is arranged within a gap between the imager substrate and the rear wall in contact with the imager substrate and the rear wall to release heat from the imager substrate to the rear wall, wherein
    the rear wall has a substrate-facing surface which faces the imager substrate through the heat dissipator, the rear wall being equipped with a retainer, the retainer holds the heat dissipator on the substrate-facing surface and inhibits the heat dissipator from flowing downward from the gap along the in-plane direction,
    the heat dissipator is made of a viscoelastic material having a viscosity of 100 to 1,000 Pa·s at −10° C. to 70° C.

\* \* \* \* \*